United States Patent
Sandolo

[11] Patent Number: 5,361,560
[45] Date of Patent: Nov. 8, 1994

[54] APPARATUS FOR FLAVORING AND PACKAGING COFFEE

[76] Inventor: Ralph Sandolo, 226 Thyar Pond Rd., Wilton, Conn. 06897

[21] Appl. No.: 959,382

[22] Filed: Oct. 13, 1992

[51] Int. Cl.$^5$ .......................... B65B 9/20; B65B 63/00; B65B 37/00
[52] U.S. Cl. .................. 53/111 RC; 53/431; 53/239; 53/551; 141/11; 141/70; 426/410
[58] Field of Search .......... 53/451, 431, 474, 111 RC, 53/551, 238, 239; 426/410, 413; 141/70, 10, 11, 14

[56] References Cited

U.S. PATENT DOCUMENTS

| | | | |
|---|---|---|---|
| 2,341,340 | 2/1944 | Sternfield et al. | 53/474 |
| 2,653,139 | 9/1953 | Sterling | 53/474 X |
| 3,506,446 | 4/1970 | Champion | 426/413 X |
| 3,777,447 | 12/1973 | Herbine et al. | 53/431 X |
| 4,233,320 | 11/1980 | Monaco et al. | 426/410 X |
| 4,606,174 | 8/1986 | Berg | 426/410 X |
| 4,608,810 | 9/1986 | Bordini | 53/551 |
| 4,617,779 | 10/1986 | Nygren et al. | 53/551 X |
| 5,067,310 | 11/1991 | Yamanaka | 53/239 X |

Primary Examiner—Horace M. Culver
Attorney, Agent, or Firm—Arthur T. Fattibene; Paul A. Fattibene

[57] ABSTRACT

A method and apparatus for flavoring coffee with a particular flavoring ingredient in situ within the package. The apparatus includes a hopper for containing a supply of coffee and a connected feed tube through which the coffee is delivered in measured amounts into the lower end of a tube of sheet material or web which is being continuously formed about the coffee feed tube to define the package for the coffee. A flavoring feed tube connected in communication to a reservoir containing a supply of flavoring material is disposed along the coffee feed tube and through which the flavoring material is circulated for injecting a predetermined amount of flavoring material into the coffee being delivered into the lower end of the continuously formed tube. The lower end of the continuous tube containing the predetermined amount of coffee and flavoring material is thereafter sealed and separated from the remainder of the continuous tube to define an individual package of flavored coffee, and the sequence repeated. The arrangement is such that the changeover of the apparatus from one flavor to another flavor is effected with a minimum of effort and/or cleaning.

6 Claims, 1 Drawing Sheet

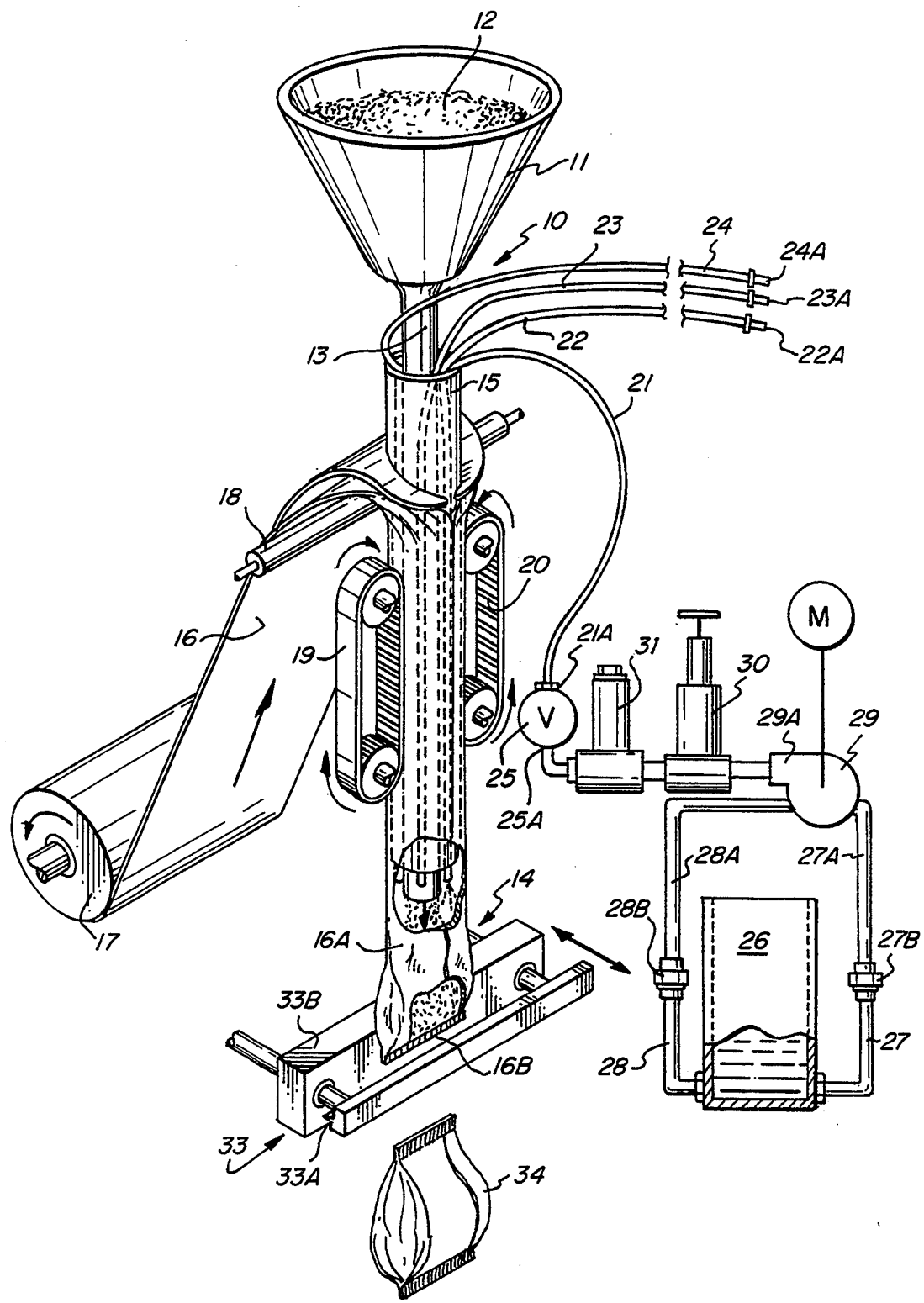

APPARATUS FOR FLAVORING AND PACKAGING COFFEE

This invention relates to a method and apparatus for flavoring coffee with a predetermined flavor in situ within the package as the package is being formed.

PRIOR ART

Heretofore, a selected flavor was added to a batch of coffee in which the mixing of the flavoring ingredient and the coffee was achieved by tumbling in bulk fashion; after which the flavored or blended coffee was processed for packaging into individual packages by conventionally known packaging machinery. A noted disadvantage with respect to this method of flavoring coffee was that coffee so flavored would permeate throughout the entire filling equipment or machine during a packaging operation, thereby making the changeover of the filling equipment or machine from one flavor to another flavor a tedious and time consuming operation necessitated by the detailed cleaning of the filling equipment or machine to remove any flavoring residue in readying the equipment to handle another batch of differently flavored coffee.

Various types of filling apparatuses are known as evidenced by U.S. Pat. Nos. 1,951,694; 2,808,858; 3,086,336; 3,184,112; 3,297,061; 3,482,373; 4,606,174; 4,608,810; 4,748,697; 4,922,975 and 4,964,259. However, these known filling apparatuses and/or methods are not considered suitable for effecting the flavoring and packaging of coffee into individual packages or containers as contemplated herein.

It is therefore an object of this invention to provide an improvement method and apparatus by which flavored coffee is packaged in individual packages in which the coffee is flavored in situ within the package as the package is being formed.

Another object is to provide a method and apparatus for flavoring coffee with various flavors whereby the changeover from one flavor to another can be effected in a minimum of time and with a minimum of cleaning of the filling apparatus.

Other features and advantages will become readily apparent in view of the specification and drawings.

SUMMARY OF THE INVENTION

This invention is directed to a coffee filling apparatus which has a hopper for containing a supply of unflavored coffee. Connected to the hopper is a coffee feed tube for directing the coffee to a bagging station. The apparatus is provided with a supply of web sheet material in the form of a roll from which the web material is fed and formed into a continuous cylindrical tube about the coffee feed tube. A conveyor or drive advances the tube of sheet material toward the bagging station. Disposed adjacent the bagging station, the apparatus is provided with a sealing and cutting station where the end of the tube of sheet material is sealed, severing the preceding portion of the sheet material which has been filled with coffee from the tube of sheet material. Extending along the coffee fill tube and disposed within the tube of sheet material are one or more flavoring fill tubes which also extend to the bagging station. The respective flavoring fill tubes are connected in communication with a corresponding reservoir containing a specific flavoring ingredient, e.g. chocolate, vanilla, Kaluaha, cherry, etc. Operatively associated with the reservoir is a circulating pump and a control valve for regulating the amount of the flavoring material to be mixed with the coffee. The arrangement is such that as a predetermined amount of coffee is delivered to the lower end of the tube of sheet material at the bagging station, a predetermined amount of flavoring material is injected into the coffee, whereby the flavoring material is combined or mixed in situ within the bag or package being formed for containing the coffee. Thereafter, the filled portion of the tube of sheet material is incrementally advanced to the cutting and severing station, where a cutter seals the upper end of the filled portion of the tubular sheet of material and severs the filled portion from the tubular sheet material while at the same time effecting a seal at the lower end of the tube of sheet material in preparation for receiving the next predetermined amount of coffee and flavoring material. Accordingly, the operation is successively repeated.

IN THE DRAWING

FIG. 1 is a perspective view of a coffee filling apparatus embodying the invention having parts shown in section and in schematic.

DETAIL DESCRIPTION

Referring to the drawing, there is illustrated a form of the invention embodying the present invention. The apparatus 10 comprises a hopper 11 for containing a supply of unflavored coffee 12. Connected to the lower end of the hopper 11 is a coffee feed tube 13 which extends toward the bagging or filling station 14. In the illustrated embodiment, a forming tube 15 is coaxially disposed in spaced relationship about the coffee fill tube 13. The apparatus 10 is also provided with means for supporting thereon a supply of sheet or web material 16 in the form of a roll 17 from which the bag or package in which the coffee is to be packaged is formed. As shown, the sheet of web material 16 is directed over a suitable roller 18 whereby the web is formed into a continuous tube 16A of sheet material about the forming tube 15. Drive means in the form of opposed endless drive conveyors are disposed to opposite sides of the forming tube and in driving engagement with the tube of sheet material being formed thereon. It will be understood that the opposed longitudinal ends of the sheet material are otherwise fused or sealed to form a continuous tube of sheet material which is progressively advanced toward the filling station 14 along the forming tube 15 by the drive means 19 and 20.

In accordance with this invention, one or more flavoring feed tubes are disposed and extend along the coffee fill tube 13 in the space between the forming tube 15 and the coffee fill tube 13. In the illustrated embodiment, four such flavoring fill tubes 21, 22, 23 and 24 are shown. The respective flavor fill tubes 21–24 terminate at a discharge end disposed adjacent the lower end of the coffee fill tube at the bagging or fill station 14. If desired, the respective discharge ends of the flavoring fill tubes 21–24 may be provided with a suitable spray nozzle for spraying the flavoring material into or onto the coffee as it is being loaded in the lower end of the cylindrical tube of sheet material, which has been sealed at its lower end 16B, as will be hereinafter described.

The other ends 21A, 22A, 23A and 24A of the respective flavoring fill tubes 21–24 are provided with a quick connector or coupler for connection to a control valve, e.g. a solenoid valve 25 for regulating the amount of flavoring material to be delivered to the coffee being delivered to the lower end of the tube of sheet material at the bagging station 14.

The flavoring material supplied to the coffee is contained in a suitable reservoir 26 which is provided with an outlet 27 and an inlet 28. Connected in communication with the outlet 27 and inlet 28 of the reservoir is a circulating pump 29. The outlet 29A of the pump 29 is connected through a pressure regulator 30 and a filter 31 to the inlet 25A of the solenoid valve 25. The arrangement is such that the pump 29, when actuated, will pump the flavoring material as required from the reservoir 26 through the pressure regulator 30 and filter 31 to the solenoid valve where the flavoring ingredient is metered for delivery to the coffee being packaged in the lower end of the cylindrical tube of sheet material at the bagging station 14. Any excess flavoring material passing through the pump 29 is recirculated back to the reservoir 26 through lines or conduits 28A and 28. In the illustrated embodiment, lines 27A and 28A by which the pump 29 is connected to the outlet 27 and inlet 28 of the reservoir are provided with suitable quick connectors 27B and 28B respectively. Thus, in the illustrated embodiment, it will be noted that coffee filling apparatus can be readily disconnected from the reservoir means which contains and supplies the flavoring material simply by effecting the disconnection between the flavoring fill tube, e.g. 21 from the solenoid valve as at 21A. Thus, to effect the changeover of the filling apparatus 10 from one flavor to another, all that is required is to effect the disconnection of line 21 from control valve 25 and the connecting the second or other flavoring line e.g. 22 to its corresponding flavoring supply means which is similar to that hereinbefore described.

However, to avoid duplication of components, e.g. duplication of the circulating system which comprises the pump 29, regulator 30, filter 31 and control valve 25, it will be noted that this system can be readily disconnected from the reservoir and filling apparatus by uncoupling connectors 21A, 27B and 28B. Thus, to effect a changeover from one flavor to another, the circulating system 29, 30, 31 and 25 is disconnected at 21A, 27B and 28B and thereafter thoroughly flushed out. After a complete flushing out of the circulating system 29, 30, 31 and 25, the system is then reconnected to the reservoir containing the desired flavoring material by connecting lines 27A, 28A of the pump to the outlet 27 and inlet 28 of the appropriate reservoir and connecting the apparatus 10 thereto by reconnecting the appropriate flavoring filling tube to the valve means 25. From the foregoing, it will be apparent that the changeover from one flavor to another can be readily accomplished with a minimum of clean up and a minimum of down time of the filling apparatus.

To complete the filling operation, it will be noted that after the predetermined amount of coffee is supplied to the lower end of the cylindrical tube of sheet material 16A at the filling station 14, and sprayed or injected with the desired amount of flavoring, the drive means 19 and 20 advances the filled portion of the cylindrical tube of sheet material 16A to a cutting and severing station 33 located downstream wise from the filling or bagging station 14. As the filled portion 16A passes the cutting and severing station, a cutter 33A is actuated to effect the sealing of the tube of sheet material immediately above the coffee contain therein and severing the sealed bag 34 from the remainder of the cylindrical tube of the sheet material 16A. In effecting the sealing and cutting, a seal is also formed at the lower end of the continuous tube 16 of sheet material for receiving the next succeeding load of coffee and flavoring material as the cutter 33A severs along the medial line of the seal formed. Opposite the cutter 33A is a cooperating anvil 33B to effect the sealing and severing operation as the cutter 33A is actuated. The seal is thus formed by the application of heat and pressure as the cutter is actuated, it being understood that the sheet material is heat fusible.

From the foregoing, it will be noted that successive, individual, sealed packages of flavored coffee are sequentially produced in an automatic manner wherein both the coffee and flavoring materials are predeterminately metered and mixed in situ within the package containing the coffee. In this manner, the filling apparatus is not contaminated by the flavoring material, thereby allowing the apparatus to be readily changed over from one flavor to another without the necessity of incurring any down time for cleaning.

The method of packaging flavored coffee is effected by forming a sheet of web material 16 into a continuous tube 16A about the coffee fill tube 13 and advancing the cylindrical continuous tube 16A toward the packaging or filling station 14. The endmost portion of the cylindrical continuous tube is initially sealed at 16B. A predetermined amount of coffee is then delivered to the filling or packaging station to fill the lower sealed end of the cylindrical tube of sheet material 16A. At substantially the same time, a predetermined amount of flavoring material, which is usually in a liquified form, is discharged or sprayed into the filling portion of the cylindrical tube of sheet material where the flavoring material is mixed with the coffee in situ within the package. The continuous tube is then advanced in an incremental manner to a cutting and severing station where the filled portion of the cylindrical tube of sheet material is simultaneously sealed and severed to define a sealed package of flavored coffee. In effecting the severing, the cutter severs the filling portion of the tube along the medial portion of the seal formed so that the lower end of the cylindrical tube is sealed as the sealed filled package is severed. Thus, the cylindrical tube is readied for receiving the next charge of coffee and flavoring material, and the operation is successively repeated.

While the invention has been disclosed with respect to a particular embodiment, variations and modifications may be made without departing from the spirit and scope of the invention.

What is claimed is:

1. An apparatus for automatically flavoring coffee with a selectable flavoring material comprising
    a hopper means for containing a supply of unflavored coffee,
    a coffee feed tube connected to said hopper means for directing the unflavored coffee from said hopper means to a bag for receiving the unflavored coffee,
    at least one flavor feed tube extending along said coffee feed tube,
    said flavor feed tube having a discharge end disposed adjacent the bag for ejecting thereinto a predetermined amount of flavoring material,
    and a flavoring supply means connected to said flavor feed tube for supplying a predetermined amount of flavoring material to said flavor feed tube whereby the flavoring material is co-mingled with the coffee directly in the bag in which the coffee is packaged, said flavoring supply means including a reservoir for containing a predetermined amount of a flavoring material, a circuit means including a circulating pump for supplying the flavoring material to said flavor feed tube, and said circulating pump including means for recirculating any excess flavoring material back to said reservoir.

2. An apparatus for automatically flavoring coffee as defined in claim 1 wherein said flavoring supply means includes a plurality of distinct reservoirs, each reservoir containing a different flavoring material, and said circuit means selectively supplying the flavoring material from one of said respective reservoirs to its corresponding flavor feed tube.

3. An apparatus for automatically flavoring coffee as defined in claim 1 and including means for feeding and forming a sheet of web material into a continuous tube about said coffee feed tube, and means for sealing the end of said continuously formed web material to define a closed end for receiving the coffee and flavoring material at the sealed end thereof, and means for advancing said filled portion of said continuous tube whereby said sealing means seals and separates the filled portion from the continuous tube.

4. An apparatus for automatically flavoring coffee with a selectable flavoring material comprising a hopper means for containing a supply of unflavored coffee, a coffee feed tube connected to said hopper means for directing the unflavored coffee from said hopper means to a bag for receiving the unflavored coffee, at least one flavor feed tube extending along said coffee feed tube, said flavor tube having a discharge end disposed adjacent the bag for ejecting thereinto a predetermined amount of flavoring material, and a flavoring supply means connected to said flavor feed tube for supplying a predetermined amount of flavoring material to said flavor feed tube whereby the flavoring material is co-mingled with the coffee directly in the bag in which the coffee is packaged, said flavoring supply means includes a plurality of distinct reservoirs, each reservoir containing a different flavoring material, and a circuit means for selectively supplying the flavoring material from one of said reservoirs to said flavor feed tube, said circuit means includes a circulating pump for circulating the flavoring material from said reservoir to said flavor feed tube, a solenoid valve interposed in said circuit between said pump and said flavor feed tube to predetermine the amount of flavoring material dispensed, and said circulating pump includes means for recirculating any excess flavoring material back to said reservoir, 5. An apparatus for automatically flavoring coffee with a selectable flavoring material comprising a hopper means for containing a supply of unflavored coffee, a coffee feed tube connected to said hopper means for directing the unflavored coffee from said hopper means to a bag for receiving the unflavored coffee, at least one flavor feed tube extending along said coffee feed tube, said flavor feed tube having a discharge end disposed adjacent the bag for ejecting thereinto a predetermined amount of flavoring material, and a flavoring supply means connected to said flavor feed tube for supplying a predetermined amount of flavoring material to said flavor feed tube whereby the flavoring material is co-mingled with the coffee directly in the bag in which the coffee is packaged, and including a plurality of flavor feed tubes extending along said coffee feed tube, and said flavoring supply means includes a plurality of reservoirs, each of said reservoirs containing a different flavoring material, each of said flavor feed tubes being connected in communication with a corresponding reservoir, and a circulating means interposed between said reservoir and its corresponding flavoring feed tube for selectively circulating a predetermined flavoring material from its reservoir to said corresponding feed tube.

6. An apparatus for automatically flavoring coffee as defined in claim 5 wherein said circulating means includes a pump for circulating a flavoring material from a predetermined reservoir to its corresponding flavor feed tube, and a valve means disposed in circuit between said pump and said flavor feed tube for determining the amount of flavoring material dispensed.

* * * * *